G. G. ELLIOTT.
WHEEL.
APPLICATION FILED OCT. 28, 1918.
1,292,734.
Patented Jan. 28, 1919.
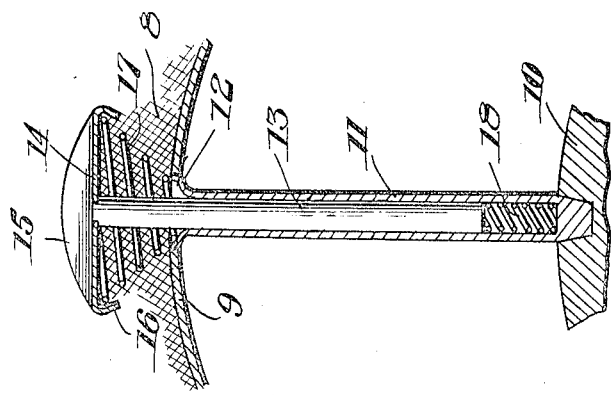
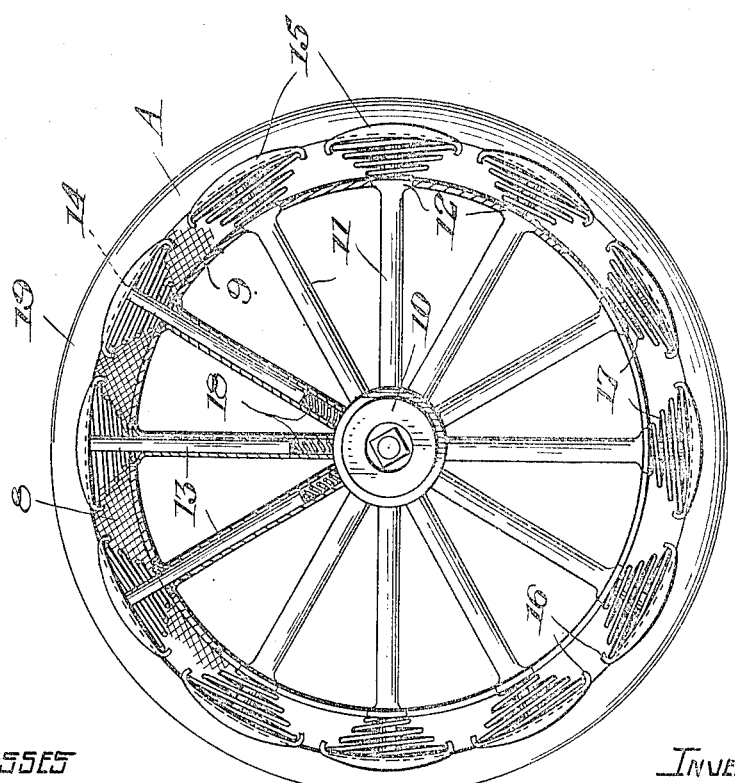
WITNESSES
INVENTOR
GEORGE. G. ELLIOTT.
BY Fetherstonhaugh
ATTYS.

UNITED STATES PATENT OFFICE.

GEORGE GUNN ELLIOTT, OF OTTAWA, ONTARIO, CANADA.

WHEEL.

1,292,734.   Specification of Letters Patent.   Patented Jan. 28, 1919.

Application filed October 28, 1918.   Serial No. 259,996.

*To all whom it may concern:*

Be it known that I, Dr. GEORGE GUNN ELLIOTT, a subject of the King of Great Britain, and resident of the city of Ottawa, Province of Ontario, Dominion of Canada, have invented certain new and useful Improvements in Wheels, of which the following is a specification.

This invention relates to improvements in wheels and the objects of the invention are to increase the resiliency of a wheel using solid tires, so that the jarring will be entirely eliminated when rough roads are being traversed, and the action will compare favorably with pneumatic tire wheels at present in use without the drawback of liability to puncture, to permit of the wheels being readily assembled, to render the several parts easily accessible for inspection, to lighten the weight of the wheel, and generally to adapt the several parts to better perform the functions required of them.

With the above and other objects in view the invention consists essentially of the improved construction particularly described and set forth in the following specification and accompanying drawings forming part of the same.

In the drawings,

Figure 1 is a side elevation of the improved wheel showing some of the spokes in section with a part of the curtain removed.

Fig. 2 is a detailed view of one of the spokes and shoes enlarged over the view in Fig. 1 and partly in section.

Like characters of reference refer to like parts in the several figures.

Referring to the drawings, A represents the improved wheel comprising the hub 10 carrying a plurality of radially extending tubular spokes 11, the outer ends of which engage the rim 9 and are splayed outwardly as shown at 12 to form cups the object of which will be made clear hereafter.

Slidably mounted in the spokes 11 are plungers 13, carrying on their outer ends shoes 14 which are provided with lateral flanges 15, the ends of the shoe being offset inwardly as shown at 16 and adapted to embrace the outer end of the spiral spring 17, the inner end of which is embraced by the cup 12.

The inner end of the plunger 13 coacts with the spring 18, housed in the spoke 11 so that any inward movement of the said spoke will be counterbalanced by the springs 17 and 18.

The tire 19 is mounted on the shoes 14 and engages the flanges 15 of the same so that no lateral displacement of the tire can take place and to prevent dirt collecting on the shoes or the springs and impairing the action of the same, flexible curtains 8 of canvas or other water proof material are arranged and suitably secured along the lateral faces of the tire 19 inclosing the space between the same and the rim 9.

Although in the embodiment illustrated I have shown the shoes 14 widely spaced apart, it will be understood that the number of spokes used in each wheel will be such that adjacent shoes 14 will only be slightly spaced, to prevent the said shoes from interlocking when they are displaced inwardly toward the hub of the wheel, at the same time give adequate support to the tire.

The assembly of the wheel will be readily understood from the foregoing description.

When the wheel is in use the plungers 11 will be displaced inwardly when the load is brought to bear upon the same and due to the location of the springs 17 and 18 any shock which would otherwise be experienced by the wheel, will be absorbed so that jarring cannot under any circumstances take place.

It will also be appreciated that due to the use of the flexible curtains 8 the springs and shoes located between the tire 19 and the inner rim 9 are not liable to be displaced or otherwise suffer in consequence of dirt or the like collecting therein.

As many changes could be made in the above construction, and many apparently widely different embodiments of my invention, within the scope of the claims, constructed without departing from the spirit or scope thereof, it is intended that all matter contained in the accompanying specification and drawings shall be interpreted as illustrative and not in a limiting sense.

What I claim as my invention is:

1. A wheel comprising a hub, a plurality of tubular spokes carried by the hub and having the outer ends splayed to form cups, plungers slidably mounted in the spokes, shoes carried by the plungers and spiral springs located between the shoes and cups.

2. A wheel comprising a hub, a plurality of tubular spokes carried by the hub having the outer ends splayed to form cups, plungers slidably mounted in the spokes, shoes carried by the plungers having lateral flanges and inwardly offset ends, springs located between the shoes and the cups and springs located between the ends of the plungers and the hub.

In witness whereof I have hereunto set my hand in the presence of a witness.

GEORGE GUNN ELLIOTT.

Witness:
RUSSEL B. SMART.